Sept. 26, 1933. G. O. L. RUDOLPH 1,928,076
COUPLING OR CONNECTER FOR PIPES FOR CONVEYING STEAM,
OIL, WATER, GREASE, OR OTHER FLUIDS
Filed Nov. 19, 1932 2 Sheets-Sheet 2

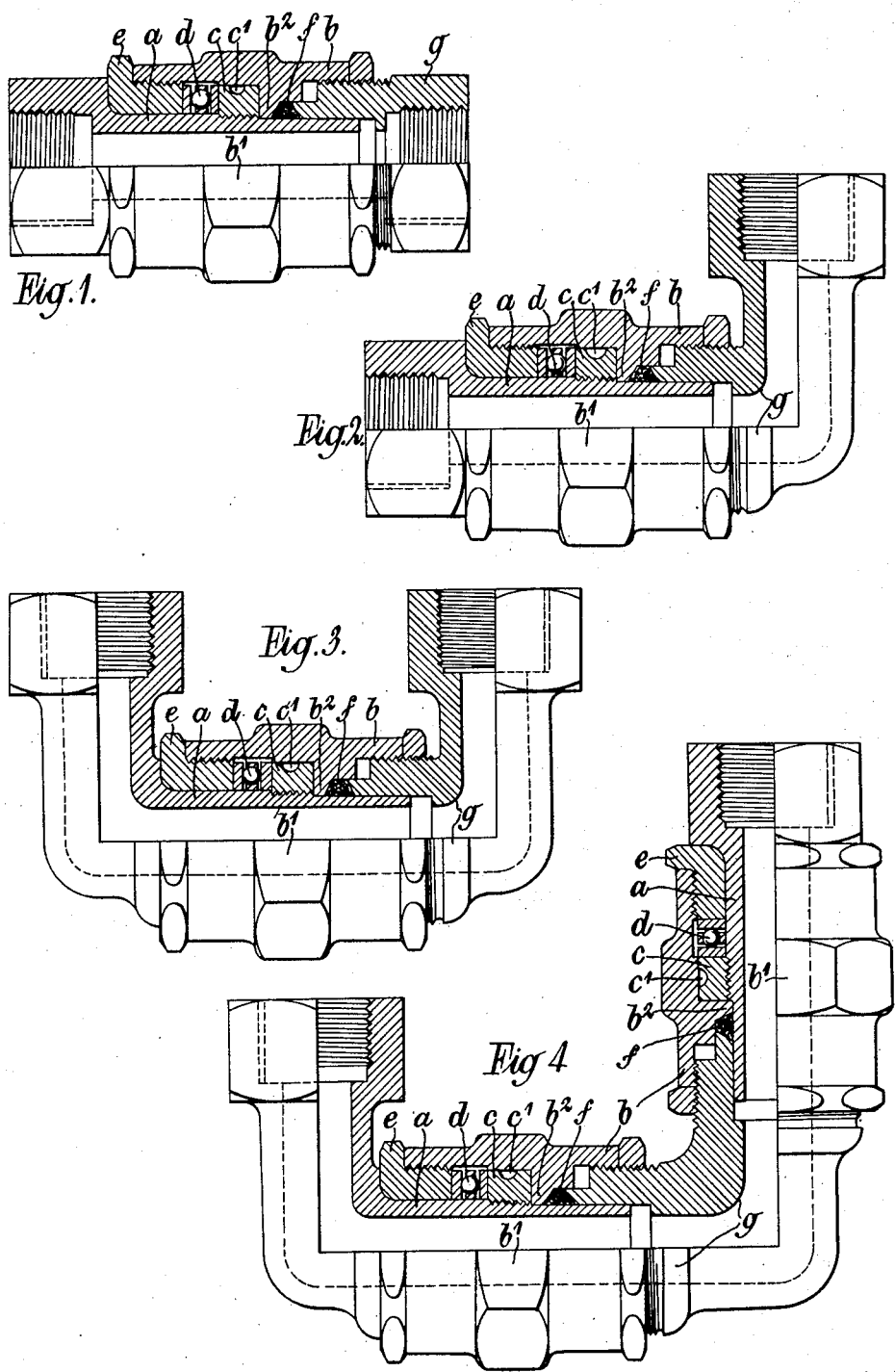

G. O. L. Rudolph
INVENTOR

By: Marks & Clerk
ATTYS.

Patented Sept. 26, 1933

1,928,076

UNITED STATES PATENT OFFICE 1,928,076

COUPLING OR CONNECTER FOR PIPES FOR CONVEYING STEAM, OIL, WATER, GREASE, OR OTHER FLUIDS

George Otto Louis Rudolph, St. Cloud-Coteaux, France, assignor to The Interlock Metal Hose Company, Limited, Bedford, England Application November 19, 1932, Serial No. 643,492, and in Great Britain November 19, 1931

3 Claims. (Cl. 285—96)

This invention relates to couplings, connections or fittings for pipes, tubes or other conduits for the conveyance of steam, oil, water, grease or other fluid or material usually under pressure, the invention having particular reference to couplings or fittings of the kind comprising two concentric members with packing and a ball bearing interposed therebetween so that while the two members are rotatable relatively to one another they cannot be axially separated.

The object of the present invention is to provide an improved form of swivel fitting of the above character which will be simple and cheap to manufacture and easy to assemble and maintain in efficient operation.

The invention consists in a swivel fitting of the kind referred to comprising an inner member and an outer concentric member and a collar secured upon the inner member adapted to form two compartments between the members in one of which is retained a ball bearing, thrust ring or the like, while the other houses suitable packing.

The invention also consists in other details hereinafter described or indicated.

The accompanying drawings illustrate several modes of carrying out the invention.

Figures 1 to 4 are half-sectional elevations showing four allied constructions of coupling in accordance with the invention;

In carrying my invention into effect in one convenient manner as shown in Figure 1 I form my improved swivel fitting from two concentric sleeves, an inner one $a$ constituting the body of the fitting and which may be straight or of elbow or other convenient form, and an outer cylindrical sleeve $b$, the central portion of which is conveniently formed upon its outer surface as a nut $b'$, while there may also be an inner radially projecting flange $b^2$ adapted to bear upon a reduced portion of the inner member. The latter is formed with an externally threaded part upon which is screwed a collar $c$ adapted to abut against a shoulder upon the member, and in those cases where the collar is intended to form a permanent joint red lead or other packing material may be used for the joint if necessary and the collar may also be pinned in place or held by a removable key.

The collar divides the space between the two members into two compartments, one of which is used for housing a thrust ball bearing $d$, ball-ring or other antifriction bearing which may be adjusted and held in place by means of a back nut $e$ screwed into the outer member and in the other compartment is located a suitable packing $f$ adjusted and held in position by a gland nut $g$ screwed into the other end of the outer member, the said gland nut being held in position conveniently by means of a lock nut.

A swivel fitting as above described possesses many advantages over known forms of swivel fitting of the kind to which the invention relates inasmuch as it eliminates entirely the necessity for the use of any split gland nut which is troublesome to machine and assemble and also any serrated or like locking ring which is expensive to make and very difficult to assemble. Further, the packing and thrust bearing are both readily accessible from the outside and the bearing can be easily lubricated when necessary. Moreover, the packing employed shows no tendency to bind upon and act as a brake on the movement of the swivel member while at the same time affording a fluid-tight joint under all pressure conditions.

In some cases two or more of such swivel connections may be associated together, for example, by means of a cross-piece connecting two or more units arranged at right angles or other inclination to one another.

Figures 2, 3 and 4 show similar types of fitting, the gland nut $g$ being of elbow form in Figure 2, while both the gland nut and body $a$ are of elbow form in Figure 3, and Figure 4 shows two similar fittings coupled together.

Figure 5:
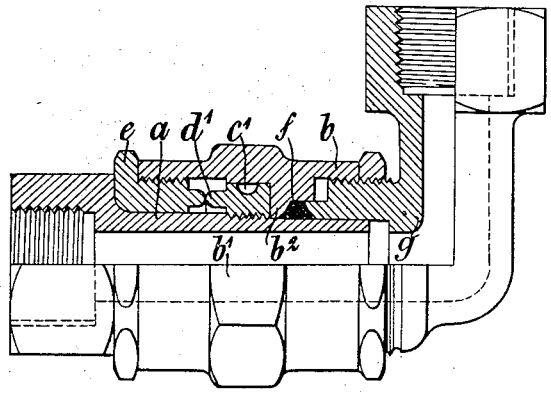
Figures 5, 6 and 7 are similar views showing three further constructions.

Figure 5 shows a similar fitting but with a phosphor bronze or other thrust ring $d'$ in place of the ball bearing.

Figure 6:
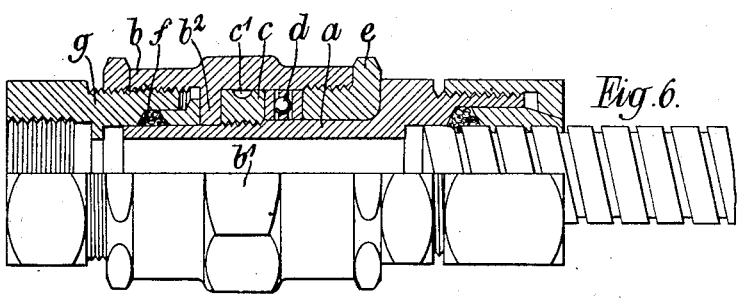

Figure 6 shows a form of construction suitable for use in conjunction with flexible metallic tubing.

Figure 7:
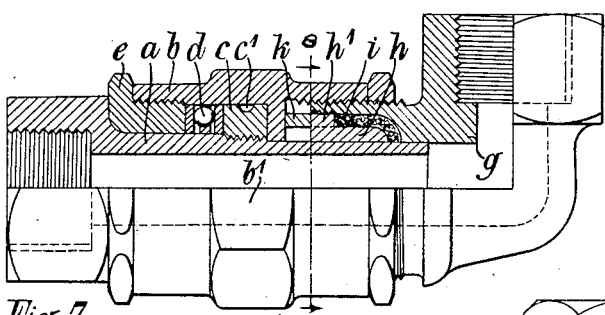
Figure 8:
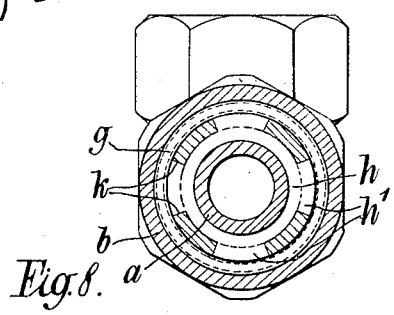
Figure 8 is a section on the line 8—8 of Figure 7.

Figures 7 and 8 show a swivel fitting in which the packing groove is constructed in such a manner that it contains a reserve of packing material which can be brought into use as and when required. Upkeep is thus reduced considerably. Into the recess in the gland nut I introduce a lining $h$ which by means of the screwed collar $h'$ is held in the former. I thus obtain a circular line of contact between the packing and the inner sleeve as well as a container for the packing reserve. On top of the latter is a plain packing ring $i$ upon which press four segments $k$. The screwed collar $h'$ of the above-mentioned lining $h$ has openings which form passages for the segments. By tightening the gland nut $g$ the segments act upon the packing ring which in turn acts upon the packing reserve. A slightly different and simpler method consists in combining the packing ring with the segments into one crown piece.

One of the objects of the invention is to reduce friction between the inner sleeve and the packing to a minimum, and therefore the former is given an absolutely smooth surface. Any grooves, serrations, tool marks, etc., which might exert a shearing action on the packing when under pressure should be avoided. On the other hand the fitting is designed in such a way that the least possible quantity of packing material bears upon the sleeve.

It is obvious that one and the same packing cannot suit all purposes. It is found that viscose or "cellophane" is a good packing for petrol, paraffin and oil. Equally satisfactory with these liquids are packing rings made of 50% talcum and 50% albumen. Both powders are mixed and submitted to the influence of boiling water. The coagulating albumen acts as a binder. Rubber or soapstone are suitable for water. Asbestos and flaked graphite are suitable for steam. However, fittings used alternately for steam and cold water, as is the case on vulcanizing presses, require a packing which will follow the alternating expansion and contraction of its different components under the influence of the high and low temperatures. A packing made of phosphor bronze wire (gauge 33) and flaked graphite has been found quite convenient, but a better packing is made of an asbestos thread with brass wire core. The wire expands and contracts when necessary and moreover possesses a certain amount of springiness which is desirable in packings.

Automatic packing rings of the cup-shaped variety are only suitable for large sized fittings, i. e., from 3" bore upwards, as in the smaller sizes they have not sufficient area to act satisfactorily under pressure, furthermore they are absolutely useless when pressures and temperatures alternate in quick succession.

All connections intended to be used at ordinary temperature are lubricated with vaseline or any suitable solid grease. A circular groove cut c' into the screwed collar is provided to contain the lubricant. A different mode of lubrication is required with fittings which are used for steam. Such fittings are provided with a hole in the outer sleeve on that part which houses the bearing.

The invention is not to be limited to the details of construction hereinbefore given by way of example since I may modify the form of the inner and outer members of my improved fitting and may vary the means adopted for retaining the packing and ball bearing in position depending upon the purpose for which the connection in accordance with the invention is to be employed or any practical requirements that may have to be fulfilled.

Having now described my invention, what I claim as new and desire to secure by Letters Patent is:—

1. A swivel fitting of the kind referred to comprising an inner member and an outer concentric member, a collar upon the inner member and an inwardly projecting flange upon the outer member dividing the space between the members into two compartments, a thrust bearing in one of said compartments and packing in the other compartment and a back nut and a gland nut threaded into the outer member for adjusting the packing and thrust bearing respectively.

2. A swivel fitting according to claim 1 having an abutment between the packing and inwardly projecting flange so that upon tightening the gland nut a reserve of packing will be brought into operation as and when required.

3. A swivel fitting according to claim 1 having a lining upon the inner member within a recess in the gland nut, a reserve of packing between said lining and said gland nut, an apertured collar abutting against the packing and segments abutting against the inwardly projecting flange and passing through the apertures in said apertured member whereby the reserve of packing may be brought into operation as and when required by tightening the gland nut.

GEORGE OTTO LOUIS RUDOLPH.